United States Patent [19]

Ernst et al.

[11] Patent Number: 5,331,622

[45] Date of Patent: Jul. 19, 1994

[54] COMPACT OPTICAL HEAD

[75] Inventors: Charles H. Ernst; Curtis A. Shuman, both of Colorado Springs, Colo.

[73] Assignee: Applied Magnetics Corporation, Goleta, Calif.

[21] Appl. No.: 132,129

[22] Filed: Oct. 5, 1993

Related U.S. Application Data

[63] Continuation of Ser. No. 705,770, May 28, 1991, abandoned.

[51] Int. Cl.⁵ .............................................. G11B 7/00
[52] U.S. Cl. .................................. 369/112; 369/110; 359/638; 359/583
[58] Field of Search ............... 369/112, 116, 100, 110; 359/638, 583

[56] References Cited

U.S. PATENT DOCUMENTS

| | | |
|---|---|---|
| 1,898,787 | 2/1933 | Newcomer . |
| 2,088,660 | 8/1937 | Newcomer . |
| 2,405,960 | 8/1946 | Land . |
| 2,432,432 | 12/1947 | MacNeille . |
| 2,816,480 | 12/1957 | Tushinsky et al. . |
| 3,536,375 | 10/1970 | Mansell . |
| 3,559,090 | 1/1971 | Refermat et al. . |
| 3,652,167 | 3/1972 | Smith . |
| 3,677,621 | 7/1972 | Smith . |
| 3,844,638 | 10/1974 | Lingenfelder et al. . |
| 3,922,069 | 11/1975 | Kishikawa et al. . |
| 3,943,019 | 3/1976 | Krekeler et al. . |
| 3,992,574 | 11/1976 | Bouwhuis et al. . |
| 3,998,524 | 12/1976 | Hubby, Jr. et al. . |
| 4,084,180 | 4/1978 | Stoffels et al. . |
| 4,084,881 | 4/1978 | Hirabayashi et al. . |
| 4,128,308 | 12/1978 | McNaney . |
| 4,253,723 | 3/1981 | Kojima et al. . |
| 4,333,173 | 6/1982 | Yonezawa et al. . |
| 4,334,300 | 6/1982 | Arquie et al. . |
| 4,358,200 | 11/1982 | Heemskerk et al. . |
| 4,399,529 | 8/1983 | Leterme et al. . |
| 4,411,492 | 10/1983 | Bluege . |
| 4,411,500 | 10/1983 | Yonezawa et al. . |
| 4,422,168 | 12/1983 | Ito et al. . |
| 4,423,495 | 12/1983 | Musha et al. . |

(List continued on next page.)

FOREIGN PATENT DOCUMENTS

| | | |
|---|---|---|
| 0005972 | 12/1942 | European Pat. Off. . |
| 0095622 | 7/1983 | European Pat. Off. . |
| 59-40606 | 3/1984 | Japan . |
| 271963 | 7/1927 | United Kingdom . |
| 561503 | 5/1944 | United Kingdom . |
| 1513314 | 7/1978 | United Kingdom . |
| 2087584 | 5/1982 | United Kingdom . |
| 2121211 | 12/1983 | United Kingdom . |

OTHER PUBLICATIONS

Yamanaka, et al., "Compact Magneto-Optical Disk Head Integrated with Chip Elements", Optical Data Storage Conference 1991 Technical Digest Series, vol. 5, pp. 138-141, Feb. 25-27, 1991.

*Primary Examiner*—Paul M. Dzierzynski
*Assistant Examiner*—Drew A. Dunn
*Attorney, Agent, or Firm*—Knobbe, Martens, Olson & Bear

[57] ABSTRACT

A compact optical head for reading or writing data on an optical disc is disclosed wherein the optical head comprises an integrated laser diode/photodetector package, a half-cube beamsplitter, and an objective lens. Light emitted from a diode laser is in transmitted to the beamsplitter and deflected towards the objective lens. The objective lens focuses the incident light on a focal point on the surface of the disc. A reflected beam travels along the same path as the incident light and is deflected by the beamsplitter toward a photodetector contained in the integrated package, wherein the photodetector is displaced from the laser diode. Other embodiments of the beamsplitter are disclosed which include a wedged plate for transmitting collimated light emitted from the laser diode, and a cylindrical lens for introducing astigmatism into the reflected beam. The present invention provides a substantial reduction in the size and volume required by the optical head, advantageously allowing the head to be easily integrated with an actuator for focussing and tracking the incident beam on the disc.

9 Claims, 5 Drawing Sheets

U.S. PATENT DOCUMENTS

| | | |
|---|---|---|
| 4,423,496 | 12/1983 | Opheij et al. . |
| 4,425,636 | 1/1984 | Musha et al. . |
| 4,441,175 | 4/1984 | Shuman . |
| 4,447,722 | 5/1984 | Saimi . |
| 4,450,547 | 3/1984 | Nakamura et al. . |
| 4,453,239 | 6/1984 | Musha et al. . |
| 4,455,085 | 6/1984 | Kato et al. . |
| 4,458,980 | 7/1984 | Ohki et al. . |
| 4,489,408 | 12/1984 | Verhoeven et al. . |
| 4,497,534 | 2/1985 | Sincerbox . |
| 4,502,783 | 3/1985 | Lau et al. . |
| 4,504,938 | 3/1985 | Tajima . |
| 4,507,766 | 3/1985 | Saimi et al. . |
| 4,525,625 | 6/1985 | Abe . |
| 4,542,492 | 9/1985 | Leterme et al. . |
| 4,565,426 | 1/1986 | Cullen . |
| 4,573,149 | 2/1986 | Deguchi et al. . |
| 4,607,356 | 8/1986 | Bricot et al. . |
| 4,612,437 | 9/1986 | Ohsato . |
| 4,624,526 | 11/1986 | Tsukai et al. . |
| 4,627,690 | 12/1986 | Fantone . |
| 4,641,926 | 2/1987 | Shirasaki . |
| 4,679,891 | 7/1987 | Roberts . |
| 4,689,481 | 8/1987 | Ono . |
| 4,691,098 | 9/1987 | Maeda . |
| 4,694,447 | 9/1987 | Cohen et al. . |
| 4,716,559 | 12/1987 | Hine . |
| 4,733,065 | 3/1988 | Hoshi et al. . |
| 4,750,819 | 6/1988 | Sugiki . |
| 4,770,507 | 9/1988 | Arimoto et al. . |
| 4,808,823 | 2/1989 | Moore et al. . |
| 4,822,151 | 4/1989 | Tatsuno et al. . |
| 4,823,335 | 4/1989 | Shikama et al. . |
| 4,850,686 | 7/1989 | Morimoto et al. . |
| 4,862,442 | 8/1989 | Tadokoro et al. . |
| 4,872,747 | 10/1989 | Jalko et al. . |
| 4,876,680 | 10/1989 | Misawa et al. . |
| 4,948,233 | 8/1990 | Maruyama . |
| 5,051,974 | 9/1991 | Taniguchi et al. ............... 369/112 |
| 5,095,389 | 3/1992 | Yokomori ....................... 359/638 |
| 5,095,476 | 3/1992 | Greve et al. ..................... 369/112 |
| 5,150,350 | 9/1992 | Aikoh et al. ..................... 369/112 |
| 5,151,889 | 9/1992 | Saimi et al. ..................... 369/112 |

COMPACT OPTICAL HEAD

This application is a continuation of application Ser. No. 07/705,770, filed May 28, 1991 now abandoned.

FIELD OF THE INVENTION

The invention relates to optical disc storage systems, and, in particular, to an optical head for transmitting light signals in such storage systems, such as computers, video disc systems, and audio disc systems.

BACKGROUND OF THE INVENTION

In many optical systems, it is often useful to separate and/or combine light beams having different optical characteristics, e.g., polarization states, wavelengths, etc. For example, in optical data storage systems, the optical qualities of the storage medium are altered in a manner such that changes in the reflective or transmissive properties of the medium are representative of the information recorded thereon. This information is commonly transmitted to and retrieved from the optical medium using light beams produced by a laser light source.

The information recorded on the disc is retrieved from the disc by directing a laser beam onto the disc. The reflected laser beam is then directed onto the detecting surface of a photodiode or other light detector system which transforms the reflected or transmitted laser beam signal into an electrical signal. In this manner, the data stored on the disc is transferred from the disc to the laser beam and converted into an electrical signal which carries the same information recorded on the disc. This electrical signal is further processed, and ultimately results in retrieval of the computer data, audio sound, video images, etc., represented by the information recorded on the disc.

Various devices have been produced for accomplishing the optical data storage procedures. Such previous devices for reading and/or writing data on optical discs typically comprise a number of discrete components for processing the light beam emitted from the laser diode. For example, such devices may include a full cube beamsplitter which is used in combination with a separate, detached collimator lens, an objective lens, a detached light source, and an array of detector elements. In particular, devices such as those illustrated in U.S. Pat. Nos. 4,399,529 and 4,507,766 illustrate the extensive number of components in some prior devices for achieving the desired result.

These prior devices experience a number of problems in connection with their operation. In particular, because of the large number of components required in these devices, they become bulky and are difficult to incorporate into a head configuration which can be easily utilized in an optical system for recording and reading data carriers. Furthermore, the large number of components creates difficulties in obtaining and maintaining element alignment and focus of the beams transmitted therethrough. In addition, the combinations of these various components create various losses in the optical efficiency of the device due to light which is lost as the beams propagate through the various device components.

Some previous devices have been based upon diffractive or holographic elements and an integrated laser diode and servo signal detector diode package. Such a system is disclosed, for example, in U.S. Pat. No. 4,624,526, wherein a diffraction grating or hologram lens is used instead of a prism for directing a read-out light beam emitted by a light source to the surface of a recording medium. However, this type of system also experiences losses in optical efficiency as the light is scattered and lost during transmission through the components of the device.

SUMMARY OF THE INVENTION

The present invention provides a compact optical head for use in optical disc data storage systems. In accordance with one embodiment of the present invention, the optical head is constructed using a finite conjugate objective lens, a laser diode/photodetector package, and a half cube beamsplitter. The small number of components are easily aligned and are organized in a manner that minimizes optical energy losses and reduces the mass and size of the optical head so as to optimize system operating efficiency and performance.

In accordance with one embodiment of the present invention, an optical head is disclosed comprising a laser diode/photodetector package, a beamsplitter, and a finite conjugate objective lens. The beamsplitter comprises a right angle prism having a hypotenuse and two legs wherein the first leg faces the laser diode/photodetector and the second leg faces an optical disc. The hypotenuse has an optically selective coating, preferably a polarization sensitive coating, deposited thereon. A flat plate is placed adjacent the hypotenuse and a quarter wave plate is positioned adjacent the second leg. The selective coating and plate act together to form a beamsplitting interface. The objective lens is positioned intermediate the quarter wave plate and the optical disc. Diverging light emitted from the laser diode is incident upon the beamsplitting interface and reflected through the quarter wave plate toward the objective lens. Upon passing through the objective lens, the incident light is focussed upon the optical disc.

If properly focussed, a reflected beam is transmitted along the same optical path back through the objective lens and collimator lens toward the beamsplitter. Upon exiting the quarter wave plate, the reflected beam is phase shifted in polarization so as to be transmitted through the interface. The reflected beam is then reflected off the plate and converges upon the detector.

Additional embodiments are disclosed wherein a lens is positioned adjacent the hypotenuse to add astigmatism to the reflected beam used in focus detection. A further embodiment is illustrated wherein the source emits collimated light and a wedged plate is placed adjacent the hypotenuse. Thus, the present invention provides an optical head requiring relatively few parts, resulting in significant reductions in size and weight when incorporated into optical disc data systems.

The present invention provides an optical head comprising a half cube beamsplitter wherein said beamsplitter comprises a triangular prism including a first leg having a first length and a second leg having a second length wherein the first and second legs are joined by a hypotenuse. A thin optical element is positioned adjacent the hypotenuse. The optical element has a front surface and a rear surface defining a thickness which is less than the first and second lengths of the first and second legs of the prism. An optically selective coating is positioned intermediate the hypotenuse and the front surface of the optical element to form a beamsplitting interface. The optical head further comprises a laser diode and photodetector assembly wherein the laser diode emits a beam of light which is transmitted through the first leg of the prism and is incident upon the beamsplitting interface. The incident light is deflected by the interface toward an optical disc. An objective lens is positioned intermediate the beamsplitter and the optical disc. The incident light beam is transmitted through the objective lens and focussed on the disc. The incident light beam is reflected by the disc to form a reflected light beam wherein the reflected light beam is transmitted through the lens and the second leg of the prism. The reflected beam is incident upon the rear surface of the thin optical element, wherein the rear surface of the thin optical element deflects the reflected beam through the first leg of the prism toward the photodetector. The optically selective coating may comprise a polarization sensitive coating. The beamsplitter may further include a quarter wave plate positioned adjacent the beamsplitter intermediate the beamsplitter and the objective lens. The thin optical element may comprise a flat plate. The thin optical element may also comprise a cylindrical lens. Additionally, the thin optical element may comprise a toric lens. The thin optical element may further comprise a knife edge roof prism. A collimating lens may be positioned intermediate the laser diode and photodetector assembly and the first leg of the prism and the objective lens may be an infinite conjugate objective lens. The rear surface of the optical element may be flat.

In one aspect of the invention, a compact head for reading or writing information on the surface of an optical disc is disclosed. The optical head comprises a source and detector assembly and a beamsplitter. The beamsplitter comprises a triangular prism having a hypotenuse and two legs wherein the legs have first and second lengths, respectively. The beamsplitter further comprises a thin optical element positioned adjacent the hypotenuse wherein the thin optical element has a front surface and a rear surface defining a maximum thickness which is substantially less than the first and second lengths of the legs of the prism. The beamsplitter further includes an optically selective coating positioned intermediate the hypotenuse and the front surface of the optical element to form a beamsplitting interface. The source and detector assembly may comprise a laser diode and quad photodetector. The optically selective coating may comprise a polarization sensitive coating. The optical head may further comprise an objective lens positioned intermediate the beamsplitter and the optical disc. The beamsplitter may further include a quarter wave plate positioned adjacent one of the legs of the prism intermediate the prism and the objective lens. The objective lens may comprise a finite conjugate objective lens. The thin optical element may comprise a flat plate. The thin optical element may also comprise a cylindrical lens. Further, the optical element may comprise a toric lens. The optical element may additionally comprise a knife edge roof prism. The objective lens may comprise an infinite conjugate objective lens and the thin optical element may comprise a wedged plate.

DETAILED DESCRIPTION OF THE INVENTION

Figures 1, 2, 3:
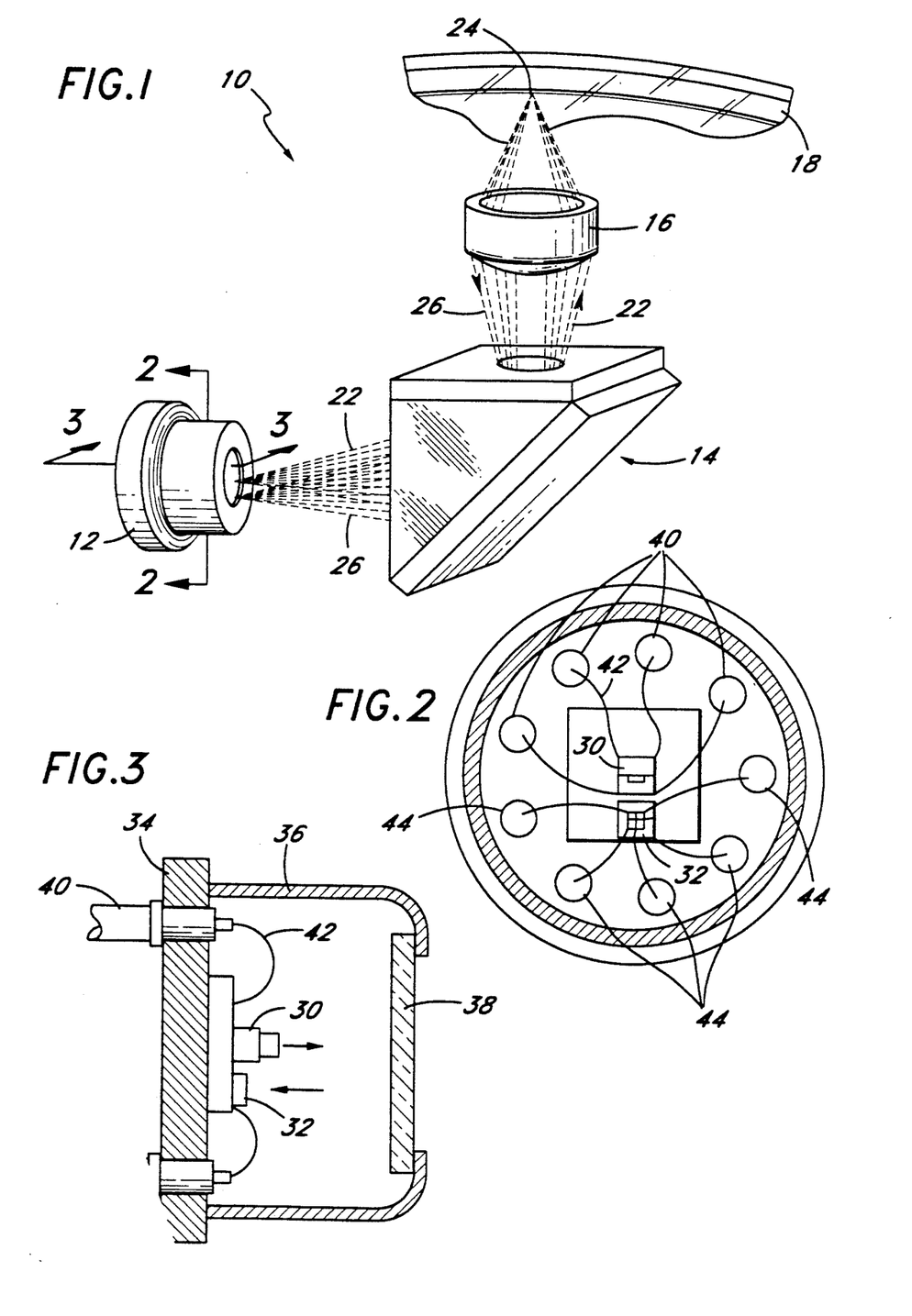
FIG. 1 is a perspective view of one preferred embodiment of the components of the compact optical head of the present invention.
FIG. 2 is a cross-sectional view of the laser diode/photodetector taken along lines 2—2 of FIG. 1.
FIG. 3 is a cross-sectional view of the laser diode/photodetector taken along lines 3—3 of FIG. 1.

FIG. 1 illustrates the components of an optical head 10 in accordance with the present invention as positioned within an optical disc storage system. The optical head 10 includes a laser diode/photodetector package 12 and a half-cube beamsplitter 14. Such a half-cube beamsplitter 14 is disclosed in copending U.S. Pat. application Ser. No. 07/705,780 filed May 28,1991 entitled "Optical Beamsplitter" and assigned to the assignee of the present invention, herein incorporated by reference. A finite conjugate objective lens 16 is positioned intermediate the beamsplitter 14 and the surface of an optical disc 18. The laser diode portion of the laser photodetector assembly 12 emits diverging light 22 which is incident upon the beamsplitter 14 and deflected through the objective lens 16. Upon exiting the objective lens 16, the light 22 is caused to converge upon a focal point 24 on the surface of the disc 18. Assuming the beam 22 is properly focussed on the recorded surface of the optical disc 18, a reflected beam 26 will be imaged back onto the same path as the incident light 22. The reflected beam 26 is modulated in accordance with the information recorded upon the disc 18. The modulated reflected beam 26 is then transmitted back through the beamsplitter 14 and, as will be explained in detail below, converges upon the photodetector portion of the laser diode/photodetector assembly 12.

Referring to FIG. 2 and FIG. 3, the laser diode/photodetector package comprises a diode laser chip 30 and a photodetector 32 mounted to a header 34 and covered by a cap 36. The cap 36 includes a window 38 for transmitting light from the laser 30 to the beamsplitter 14 and for receiving light from the beamsplitter 14 which is incident upon the photodetector 32. Electrical leads, generally designated 40, are connected to the diode laser chip 30 via bond wires 42 and transmit power to the diode 30 from a power supply (now shown). The photodetector 32 is preferably a quad detector which generates focus and tracking signals for the servo system (not shown) and transforms the incident optical signal into an electrical signal carrying the same information encoded on the disc 18 and contained in the modulated reflected light beam 26. This electrical signal is transmitted via electrical leads 44, preferably connected to the detector 32 by bond wires 42, to associated processing circuitry (not shown) which processes the electric signal and ultimately generates the encoded data represented by the information recorded on the disc 18.

Figures 4, 5:
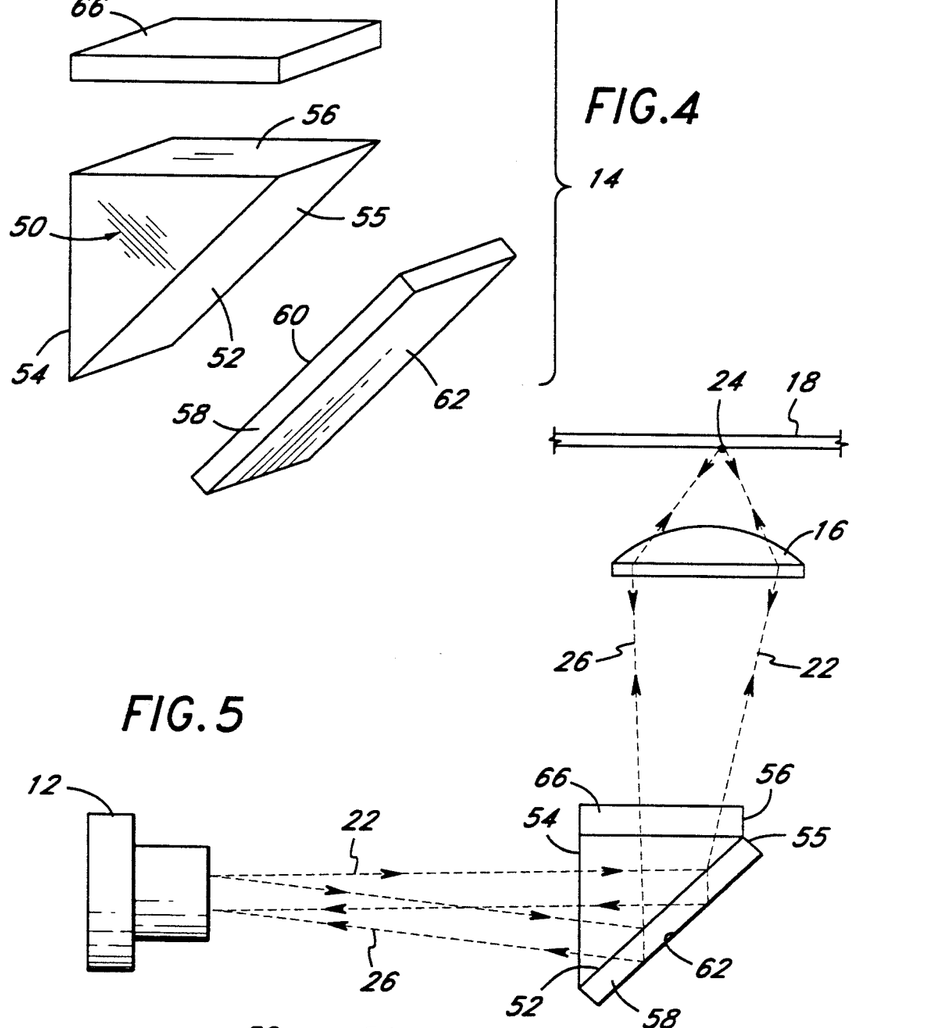
FIG. 4 is an exploded perspective view of one preferred embodiment of a half cube beamsplitter for use with the present invention.
FIG. 5 is a side schematic illustration of one preferred embodiment of the components of the present invention, illustrating the beam paths communicated between those components and an optical disc.

FIG. 4 is an exploded view of the components of the beamsplitter 14. The beamsplitter 14 comprises a right angle prism 50 having three sides which, as viewed from the side in FIG. 4, appear as a hypotenuse 52 and two legs 54, 56 of a right-angle triangle, wherein the first leg 54 faces the source/detector package 12, and the second leg 56 faces the recorded surface of the optical disc 18. The hypotenuse 52 of the prism 50 is coated with an optically selective coating. The beamsplitter 14 further includes a flat plate 58 having a front surface 60 and a back surface 62 positioned adjacent the hypotenuse 52 of the right angle prism 50 and a quarter wave plate 66 placed adjacent the second leg of the prism 56. The selective coating deposited on the hypotenuse 52, and the flat plate 58 act to form a beamsplitting interface 55.

With reference to FIG. 5, the beam paths between the laser diode/photodetector 12 and the optical disc 18 will be described in more detail. The laser diode 30 emits diverging light 22 through the first leg 54 of the prism 50. The diverging beam 22 is incident upon the beamsplitting interface 55. Preferably, the optically selective coating comprises a polarization sensitive coating and the incoming diverging light 22 is polarized such that the light 22 will be reflected by the beamsplitter 14 in a diverging beam toward the quarter wave plate 66. Upon passing through the quarter wave plate 66, the diverging incident light 22 becomes circularly polarized. This diverging circularly polarized light 22 is then converged and focussed at a point 24 on the surface of the optical disc 18 by the finite conjugate objective lens 16.

Assuming the incident beam 22 is properly focussed on the recorded surface of the optical disc 18, the reflected beam 26 will be imaged back onto the same path as the incident light 22. The reflected beam 26 is modulated in accordance with the information recorded upon the surface of the disc 18. Upon reflection from the disc 18, the modulated reflected beam 26 is transmitted back through the objective lens 16 and quarter wave plate 66 and enters the beamsplitter 14 in converging beams. The quarter wave plate 66 renders the circularly polarized reflected beam 26 linearly polarized, but phase shifted by 90 degrees, one quarter of a wavelength, from the incident linearly polarized beam 22. As the now linearly polarized reflected beam 26 strikes the beam splitting interface 55, it is transmitted through the interface 55 to the back surface 62 of the flat plate 58. The converging reflected beam 26 is reflected off the back surface 62 of the plate 58 and converges upon the detector 32. Light reflection at the back surface 62 of the plate 58 can be accomplished in a variety of ways including application of a high reflectivity coating to the back surface 62 or orientation of the plate 58 to effect total internal reflection. The detector 32 transforms the reflected beam into an electrical signal subsequently processed and analyzed to obtain the information recorded on the surface of the disc 18.

Figure 6:
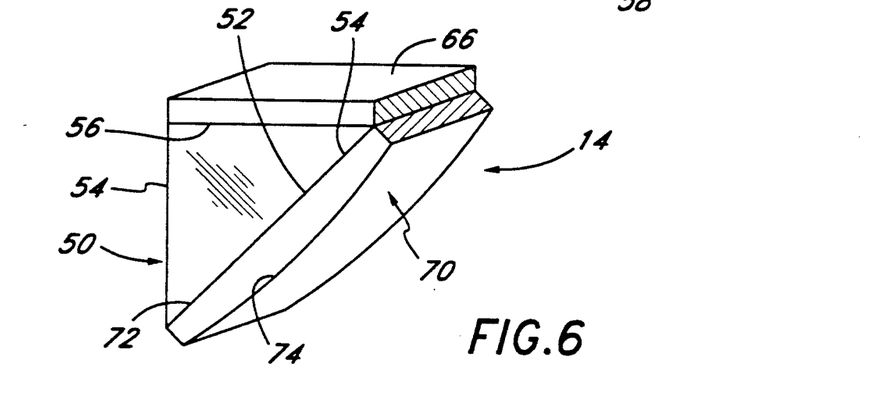
FIG. 6 is a perspective view of another preferred embodiment of a half cube beamsplitter including a cylindrical lens for use with the present invention.
Figure 7:
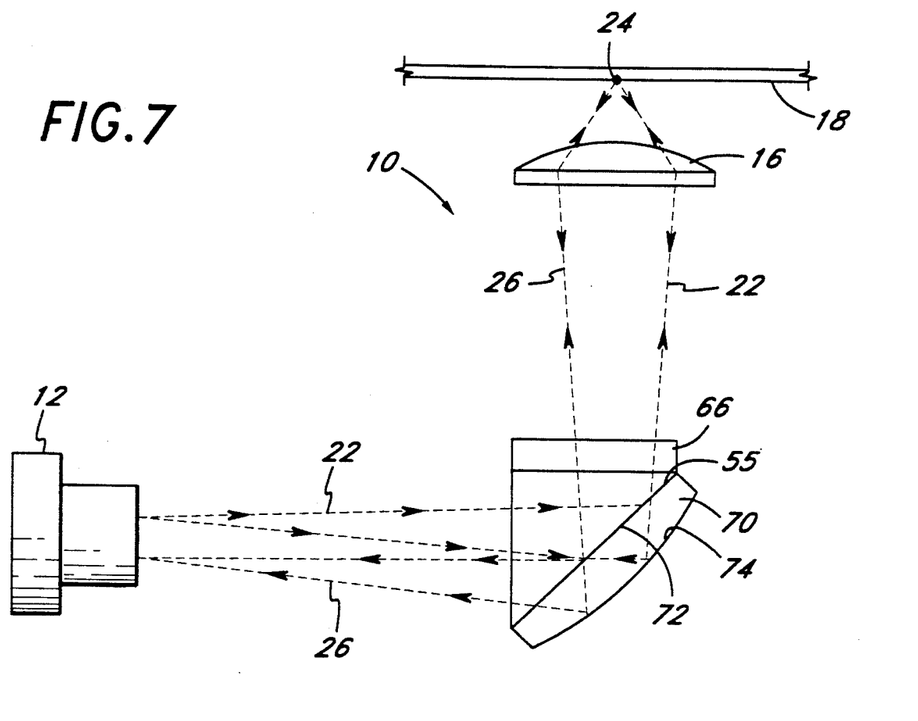
FIG. 7 is a side schematic illustration showing another preferred embodiment of the components of the present invention, including the half cube beamsplitter of FIG. 6, and illustrating the optical beam paths communicated between the components and an optical disc.
Figure 10:
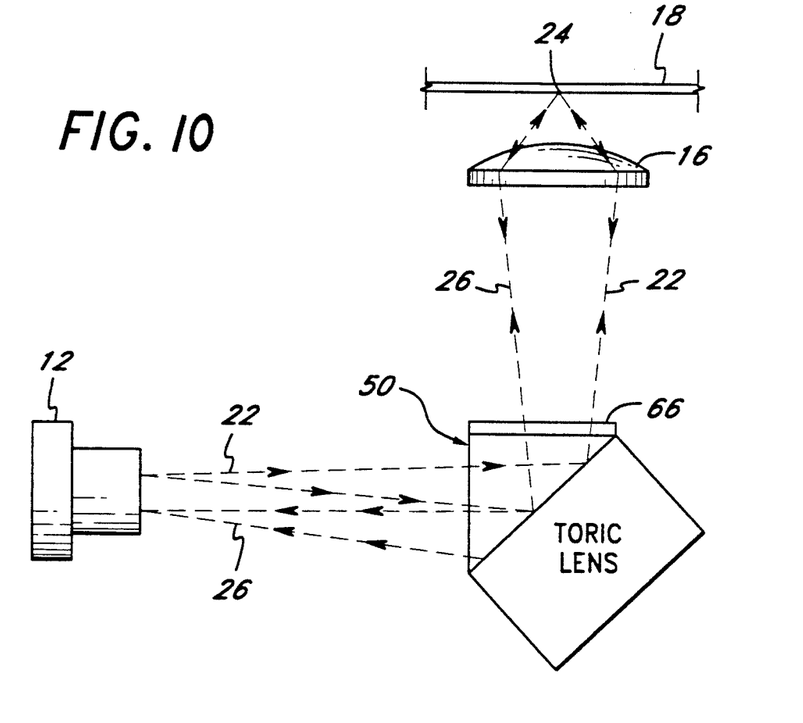
FIG. 10 is a schematic illustration of a further embodiment of the present invention wherein the optical element comprises a toric lens.
Figure 11:
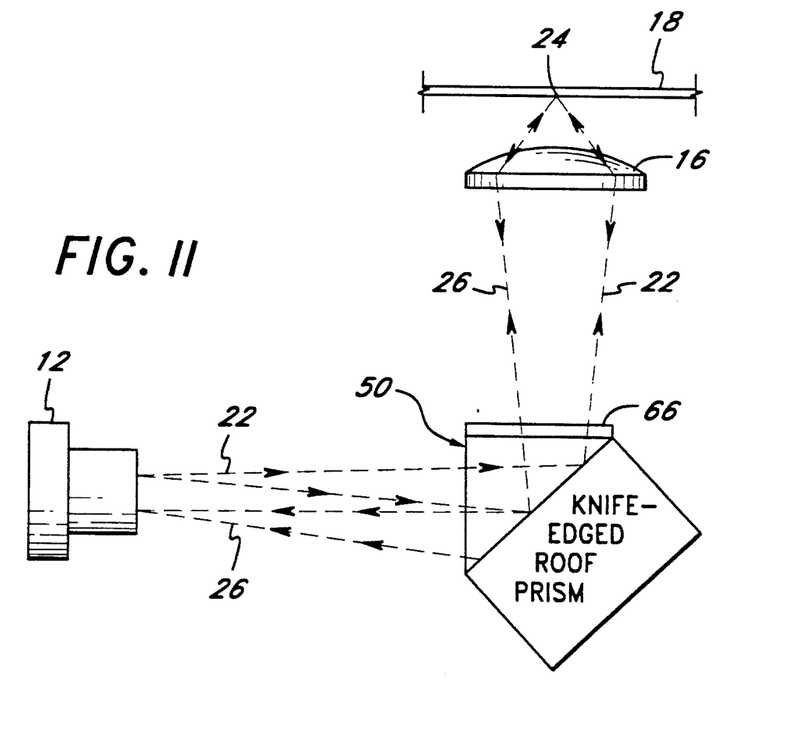
FIG. 11 is a schematic illustration of a further embodiment of the present invention wherein the optical element comprises a knife edged roof prism.

FIG. 6 and FIG. 7 illustrate another embodiment of the present invention wherein a curved plate or cylindrical lens 70 having a front surface 72 and back surface 74 is placed adjacent the hypotenuse 52 of the right-angle prism 50 in the beamsplitter 14. In this embodiment, the lens 70 can be advantageously used to add a small amount of astigmatism to the reflected beam 26 in order to generate an astigmatic focus detection signal on the photodetector 32. It will be noted that the beam paths shown in FIG. 7 are substantially identical to those shown in FIG. 5 such that the diverging beam 22 emitted from the laser diode 30 is reflected by the beam splitting interface 55 and focussed upon the surface of the optical disc 18. If properly focussed, the reflected beam 26 travels the same path as the incident beam 22. The reflected beam 26 enters the beamsplitter 14 shifted in polarization by 90 degrees such that the beam 26 is transmitted through the interface 55 and reflected off the back surface 74 of the lens 70. Upon reflection from the back surface 74 of the lens 70, the beam 26 converges at the photodetector 32. The cylindrical shape of the lens 70 introduces a small amount of astigmatism into the reflected beam 26 which can be processed by the photodetector 32 so as to generate an astigmatic focus detection signal. Those skilled in the art will recognize that other well-known optical elements such as a knife-edge roof prism shown in FIG. 11, or a toric lens shown in FIG. 10, could be used in place of the cylindrical lens 70 to modify the return beam 26 to generate a servo signal for focus detection.

Figure 8:
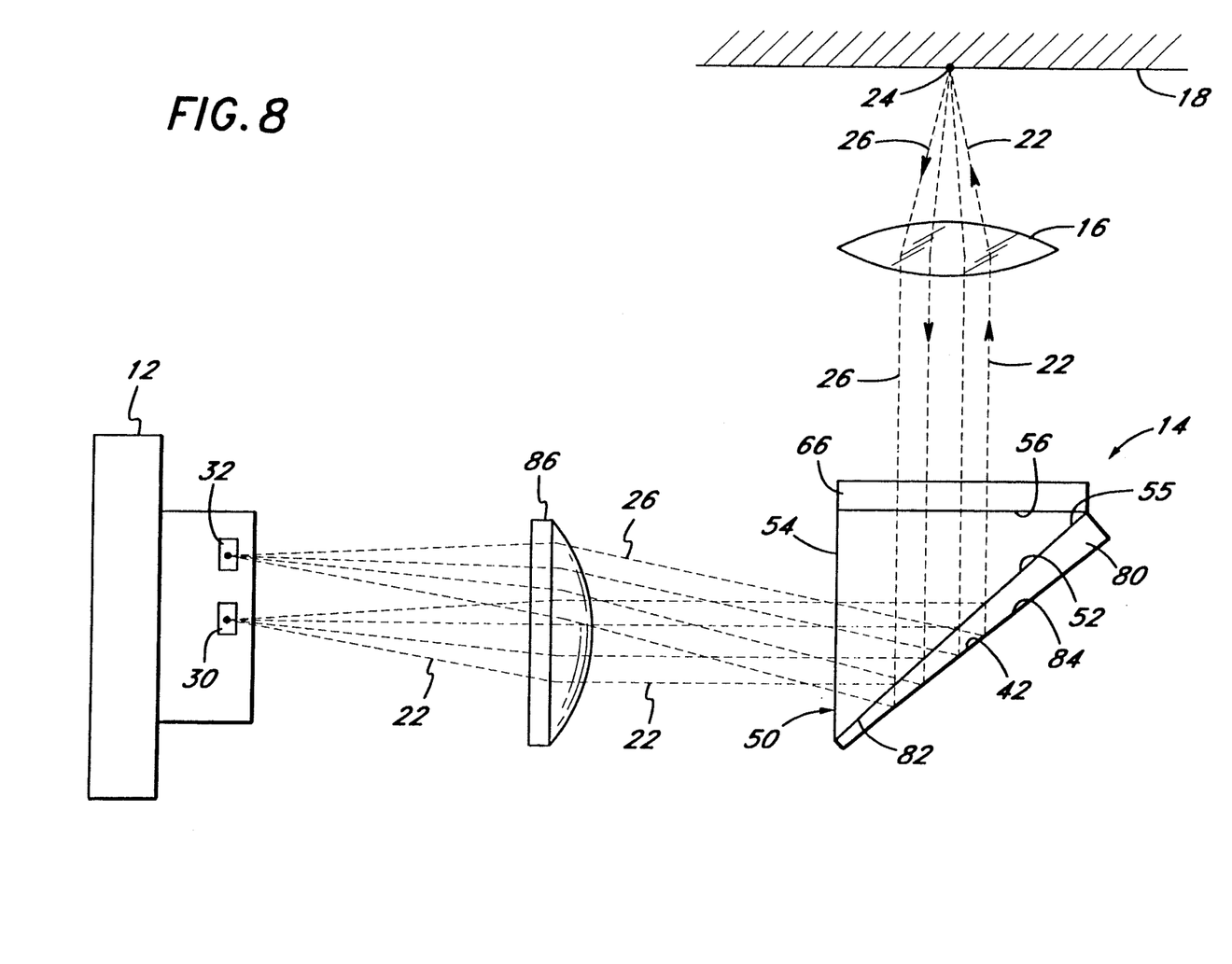
FIG. 8 is a schematic illustration of a further embodiment of the present invention wherein the beamsplitter includes a wedged plate.

FIG. 8 illustrates a further embodiment of the components of the optical head 10 of the present invention where the beamsplitter 14 includes a wedged plate 80 having a front surface 82 and a back surface 84 positioned adjacent the beam splitting interface 55. The optical head 10 further comprises a collimating lens 86 placed intermediate the laser diode/photodetector 12 and beamsplitter 14. The laser diode 30 emits diverging light 22 to the collimating lens 86 which renders the incoming light rays 22 substantially parallel and transmits the collimated light toward the beamsplitter 14. The hypotenuse 52 of the prism 50 is coated with a polarization sensitive coating at the beam splitting interface 55 formed between the hypotenuse surface of the prism 50 and the front surface 82 of the wedged plate 80. In this configuration, collimated laser light, incident upon the beam splitting interface 55, is preferably linearly polarized such that the light will be reflected by the beamsplitter 14 toward the quarter wave plate 66. The beamsplitter 14 is preferably oriented such that the incoming light beam 22 is incident upon the interface 55 at a 45 degree angle and is thus orthogonally deflected toward the quarter wave plate 66. Upon passing through the quarter wave plate 66, the incident substantially linearly polarized light 22 becomes circularly polarized. This collimated circularly polarized light is then focused onto the surface of the optical disc 18 by the objective lens 16.

Assuming the beam is properly focussed on the recording surface of the optical disc 18, the reflected beam 26 will be imaged back along the same path as the incident light 22. The reflected beam 26 is modulated in accordance with the information recorded upon the surface of the disc 18. Upon reflection from the disc 18, the modulated reflected beam 26 is transmitted back through the objective lens 16 and quarter wave plate 66.

The quarter wave plate 66 renders the circularly polarized reflected beam 26 linearly polarized, but phase shifted by 90 degrees, one quarter of a wavelength, from the incident linearly polarized beam 22. As the now linearly polarized reflected beam 26 strikes the beam splitting interface 55, it is transmitted through the interface 55 to the back surface 84 of the wedged plate 80. Because of the wedge angle between the front and back surfaces 82, 84, the polarized reflected beam 26 strikes the back surface 84 of the plate at an angle greater than 45 degrees and is thus reflected at an angle with respect to the incoming beam 22 toward the collimating lens 86. The lens 86 causes the reflected beam 26 to converge at the detector 32 at a point displaced from the laser diode 30. The angle between the front and back surfaces 82, 84, of the wedged plate 80 is selected so as to cause the reflected light beam 26 to converge on the detector 32. As described above, the detector 32 transforms the optical signal into an electrical signal carrying the same information encoded on the disc 18 and contained in the modulated reflected light beam 26.

In the embodiments described above, the legs of the prism are preferably approximately 6 mm and the maximum thickness of the optical element positioned adjacent the prism is less than the length of the legs of the prism and is preferably in the range of 0.5 to 2 mm. It should be understood, however, that the proportions of the prism and optical element positioned adjacent thereto could be scaled for implementation in numerous other optical systems in a variety of applications. For example, in an optical system with larger physical dimensions, the dimensions of the prism and optical element could be made larger while still maintaining the same proportional relationship, and conversely, in an optical system with smaller dimensions, the dimensions of the prism and plate could be made smaller while still maintaining the same proportional relationship.

Figure 9:
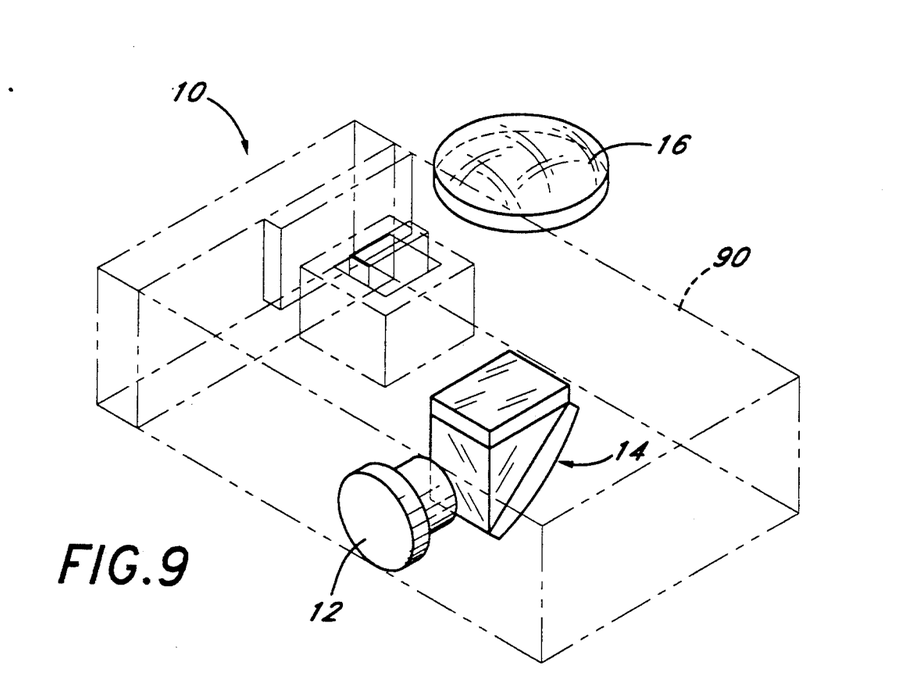
FIG. 9 is a perspective view of one preferred embodiment of the components of the optical head of the present invention, illustrating their configuration within the boundaries of the optical head, shown in phantom lines.

FIG. 9 illustrates the components of the optical head 10 as positioned within a housing 90. The housing 90 can also enclose the actuator (not shown) used for focussing and tracking the incident beam 22 on the disc 18. It will be noted that the present invention provides a substantial decrease in size and thus, weight, of the optical head 10, enabling the head 10 to be incorporated into a very small package with a low part count. This compact optical head 10 may be utilized in several optical memory systems using any media based on data signals derived from intensity variations caused by changes to the sensitive layer. Although the above-described embodiments have been described in terms of read-only systems, those skilled in the art will recognize that the present invention could be directly incorporated into write-once systems and phase change based read/write systems as well. Applications of the read-only optical heads include compact audio disc systems, video disc systems, and CD-ROM disc systems. Furthermore, the above-illustrated embodiments depict finite conjugate objective lenses. Those skilled in the art will recognize that infinite conjugate objective lenses could also be utilized by adding a collimation objective lens to the system, still maintaining the low part count and reduced size and weight of the present invention.

With the optical head of the present invention, the paths of the forward incident beam and reflected return beam are substantially identical so that higher optical efficiency is realized and feedback into the laser cavity is reduced. Further, since the forward and return paths are substantially the same both optically and mechanically, the paths are thus substantially thermally equivalent, and automatic thermal correction of defocusing is achieved.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical head comprising:
   a half-cube beamsplitter, wherein said beamsplitter comprises:
      a triangular prism including a first leg having a first length and a second leg having a second length, said first and second legs joined by a hypotenuse;
      an optical element positioned adjacent said hypotenuse, said optical element having a front surface and a rear surface defining a thickness which is less than said first and second lengths of said first and second legs of said prism; and
      an optically selective coating positioned intermediate said hypotenuse and said front surface of said optical element to form a beamsplitting interface;
   a laser diode and photodetector assembly, comprising a laser emitting diode and a photodetector, said laser diode emitting a beam of light transmitted through said first leg of said prism and incident upon siad beamsplitting interface, said incident light defelcted by said interface toward an optical disc; and
   an objective lens positioned intermediate said beamsplitter and said optical disc, wherein said incident light beam is transmitted through said objective lens and focussed on said disc, said incident light beam reflected by said disc to form a reflected light beam, wherein said reflected light beam is transmitted through said lens and said second leg of said prism, said reflected beam incident upon said rear surface of said optical element, wherein said rear surface of said optical element deflects said reflected beam through said first leg of said prism toward said photodetector.

2. The optical head defined in claim 1, wherein said optically selective coating comprises a polarization sensitive coating.

3. The optical head defined in claim 1, wherein said beamsplitter further includes a quarter wave plate positioned adjacent said beamsplitter intermediate said beamsplitter and said objective lens.

4. The optical head defined in claim 1, wherein said optical element comprises a flat plate.

5. The optical head defined in claim 1, wherein said optical element comprises a cylindrical lens.

6. The optical head defined in claim 1, wherein said optical element comprises a toric lens.

7. The optical head defined in claim 1, wherein said optical element comprises a knife edge roof prism.

8. The optical head defined in claim 1, wherein a collimating lens is positioned intermediate said laser diode and photodetector assembly and said first leg of said prism and said objective lens is an infinite conjugate objective lens.

9. The optical head defined in claim 1, wherein said rear surface of said optical element is flat.

* * * * *

UNITED STATES PATENT AND TRADEMARK OFFICE
CERTIFICATE OF CORRECTION

PATENT NO. : 5,331,622
DATED : July 19, 1994
INVENTOR(S) : Charles H. Ernst and Curtis A. Shuman It is certified that error appears in the above-indentified patent and that said Letters Patent is hereby corrected as shown below:

Column 8, Line 31, change "siad" to --said--.

Column 8, Line 32, change "defelcted" to --deflected--.

Signed and Sealed this

Seventh Day of February, 1995

Attest:

BRUCE LEHMAN

Attesting Officer

Commissioner of Patents and Trademarks